United States Patent [19]

Samuelson et al.

[11] 4,343,503
[45] Aug. 10, 1982

[54] SNAP-ON WINDSHIELD FOR GOLF CARTS AND LIKE VEHICLES

[75] Inventors: Donald G. Samuelson; Paul R. Farris, both of Augusta, Ga.

[73] Assignee: Club Car Inc., Augusta, Ga.

[21] Appl. No.: 169,957

[22] Filed: Jul. 18, 1980

[51] Int. Cl.³ .............................................. B60J 1/02
[52] U.S. Cl. ..................................... 296/84 D; 49/57
[58] Field of Search ............ 296/84 R, 84 D; 49/463, 49/465, 57; 248/229

[56] References Cited

U.S. PATENT DOCUMENTS 3,836,106  9/1974  Gray ................................... 248/229
4,014,589  3/1977  Yerkey ............................... 296/78 R

FOREIGN PATENT DOCUMENTS 522630  8/1920  France ............................... 296/84 D Primary Examiner—Randolph A. Reese
Assistant Examiner—John A. Carroll
Attorney, Agent, or Firm—Laurence R. Brown

[57] ABSTRACT

Windshields are mounted on rod frameworks from the front by means of an extruded resilient plastic member defining two perpendicularly disposed U-shaped cavities respectively for frictionally engaging and holding the windshield edge and the framework rods.

To retain the windshield on the vehicle against accidental dislodging by a blow etc., a retainer in the vehicle cowling at the bottom of the windshield in the form of a removable clip is provided. A canopy top is mounted on the framework with an overlying rim that similarly retains the top edge of the windshield.

12 Claims, 4 Drawing Figures

SNAP-ON WINDSHIELD FOR GOLF CARTS AND LIKE VEHICLES

TECHNICAL FIELD

This invention relates to windshield mounting methods and apparatus, and more particularly it relates to windshield structure capable of optional quick snap-on mount and dismount.

BACKGROUND ART

In such vehicles as golf carts, windshields are not always wanted or necessary, particularly in mild, dry weather. However in damp, windy or cool weather it is desirable to have a top canopy and windshield assembly. However heretofore there has not been available any satisfactory simple quick changeover windshield assembly that can be optionally mounted and dismounted by "snap-on" techniques.

One significant problem in providing such feature is that conventional windshield mounts require elaborate framework generally with several specially shaped rubber or plastic seals to resiliently hold the glass and for waterproofing. The nature of these mounts has been such that special tools must be used and or many screw fasteners, clamps and panels need be removed to dismount a windshield.

Another significant problem is that if a canopy top is retained as a sunshade, and the windshield assembly is removed, there has not been a satisfactory prior art framework mount that serves both purposes and is yet simple, inexpensive and appropriately decorative.

Deficiencies exist in various prior art windshield arrays. Thus, flexible sheets used for golf carts as represented by U.S. Pat. Nos. 3,709,553 C. W. Churchill et al. Jan. 9, 1973; 3,958,826 F. E. Upton May 25, 1976; 4,014,589 E. C. Yerkey Mar. 29, 1977 and 4,098,536 M. T. Mills July 4, 1978 can wrinkle and have very limited life. They flap in the wind and are easily damaged.

Windshield assemblies of curved or special shape are not only expensive and critical in manufacture but cannot easily be stored. Examples of these are shown in U.S. Pat. Nos. 3,819,226 H. W. Sykora June 25, 1974 and 3,923,338 C. C. Sovia et al. Dec. 2, 1975.

Although snap-on type optional windshields are known such as illustrated in U.S. Pat. No. 3,829,152 L. T. Hobbs Aug. 13, 1974 they require special fittings incompatible with the windshield structure of limited life and difficult to manufacture and attach to the windshield.

In general mounting of glass windshields has in the prior art neither afforded a satisfactory snap on type arrangement nor a simplified mounting procedure. Typical of the complex array of gaskets, brackets, etc. required to mount glass windshields in the prior art are U.S. Pat. Nos. 4,093,304 H. Ziegler June 6, 1978 and 4,151,620 E. Heuzonter May 1, 1979.

Thus, it is an objective of this invention to improve the status of the prior art and resolve the problems of the prior art including those aforesaid. Other objects, features and advantages of the invention will be found throughout the following description, drawing and claims.

DISCLOSURE OF THE INVENTION

Windshield mounting means for golf carts and like vehicles are optionally quickly mounted and dismounted by a snap-on feature afforded by this invention. It becomes feasible with a novel resilient plastic frictionally engaging edge mount member about the edges of the windshield.

The plastic snap-on member presents a simplified single extruded strip longitudinally presenting two generally U-shaped cavities, one registering over the edge of the windshield and the other frictionally snapping in resiliently held frictional engagement over a cylindrical rod framework member.

The framework for holding a windshield assembly on a golf cart comprises a U-shaped cylindrical rod mounted on the cowling of a golf cart, with the strip members engaging three edges of the windshield and corresponding mating framework rod portions. A removable clip on the cowling retains the windshield against accidental snap-off on the fourth edge. A canopy top mounted on the framework has an overlapping rim similarly retaining the top edge of the windshield.

Other features, advantages and objectives of the invention will be found throughout the following description, drawing and claims.

PREFERRED EMBODIMENT

Figure 1:
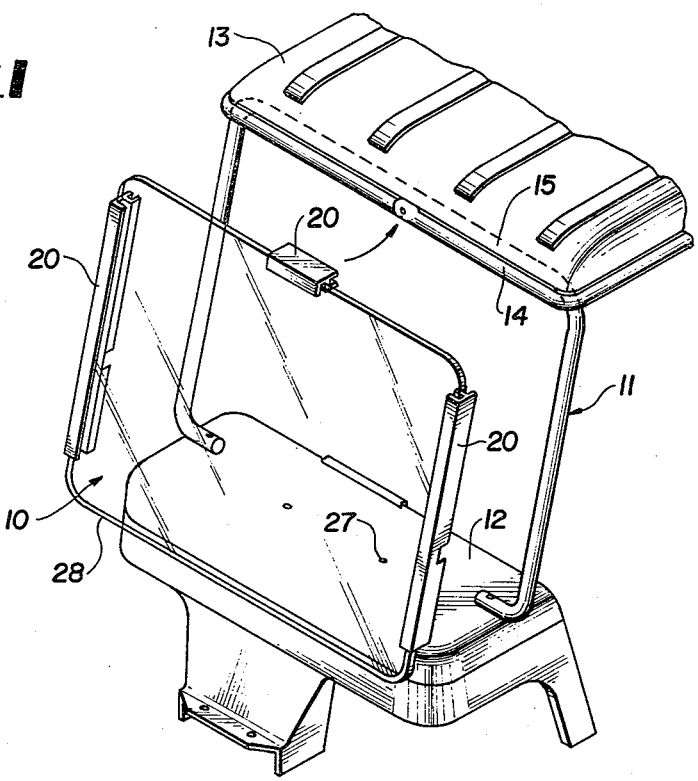
FIG. 1 shows in perspective a fragmental view of a golf cart and windshield assembly in position for the snap mounting feature provided by this invention.
Figure 2:
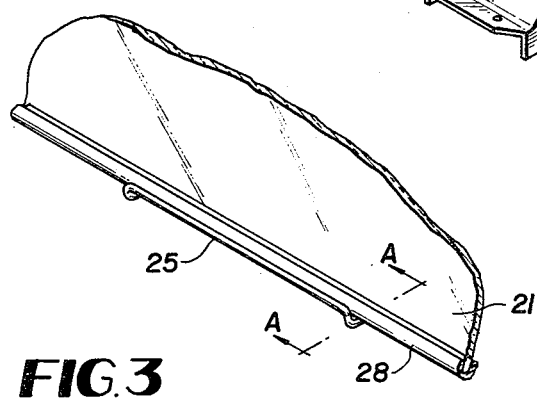
FIG. 2 is a fragmental front view in perspective of a windshield retainer clip afforded by the invention.
Figure 3:
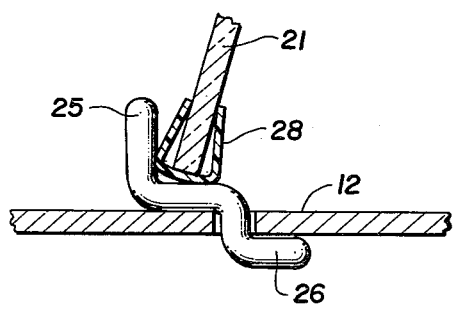
FIG. 3 is a fragmental side view, partly in section of the clip and windshield taken along lines A—A of FIG. 2.

As may be seen in FIGS. 1 to 3, a windshield assembly 10 may be optionally snapped onto the generally U-shaped cylindrical post frame 11 which is positioned on the cowling 12 of a golf cart, or other vehicle. The frame 11 also supports a top canopy 13 where a rim 14 extends down over the top cross link 15 of the framework 11.

The snap on mounting medium consists of the extruded plastic strip 20 which frictionally engages the windshield 21 along the top and sides and mates in registration with the side posts and top link 15 of the framework cylindrical rod structure to snap on and be dismounted at will.

To retain the windshield array 10 in place in snapped on position, the upper edge engages the framework cross link rod 15 behind rim 14 of the canopy, which thereby restrains forward displacement of the windshield array 10. Thereby accidental impact cannot dislodge the windshield array 10 at the top. At the bottom as seen in FIGS. 2 and 3 a mounting clasp rod 25 abuts the front of the snapped on windshield array 10. This clasp rod is simply mounted by engaging the two end clasp rod legs 26 into mating holes 27 in the cowling, so that the clasp and windshield 21 frictionally interlock by means of the cushion plastic strip 28 on the bottom edge of windshield 21.

Figure 4:
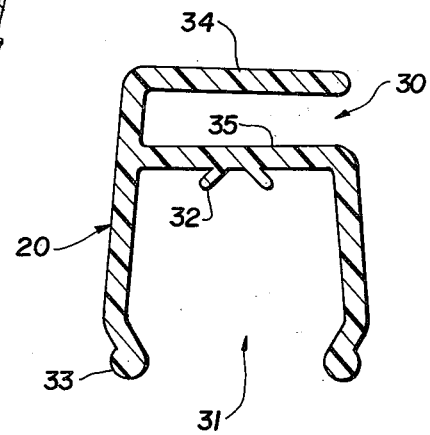
FIG. 4 is an end view in section of the extruded plastic mounting member afforded by this invention.

The simplified plastic strip 20 is a critical feature of the invention. It is shown in cross section in FIG. 4. This strip 20 presents two generally U-shaped cavities 30, 31 oriented perpendicularly for respectively receiving in frictional elastic or resilient engagement the edge of a windshield and a circular frame rod. It is made of a rigid PVC with a specific gravity of 1.35 and a hardness of durometer 80-D.

Typically the cavity 30 is a tight fit over a windshield glass edge of the order of 0.2 inches (0.5 cm) thick and the cavity 31 nests in receptacle flanges 32 a 0.75 inch (1.9 cm) diameter cylindrical rod so that the cylindrical rim knobs 33 tightly embrace the rods over center and thereby provide a slide over snap-on fitting. The U-shaped cavity 30 is formed by a substantially L-shaped portion 34 extending from the end common wall 35 of the U-shaped cavity 31.

It is clear therefore that a novel, simplified and improved mounting strip, window assembly and method of optionally snapping on a windshield assembly as required are afforded by this invention. Those novel features believed descriptive of the spirit and nature of the invention are defined with particularity in the appended claims.

INDUSTRIAL APPLICATION

An optionally removable snap-on windshield assembly is provided for golf carts or the like vehicles. Thus, quick installation can be made in inclement weather and removal is likewise quickly achieved.

We claim:

1. Windshield mounting means for removably snap fitting a rigid glass windshield on a framework generally comprising a framing rod array, comprising in combination, a resilient plastic extruded member for frictionally engaging and fitting said windshield without further windshield fastening and holding means on said framing rod array disposed about a windshield location to provide a framework, said member holding said windshield glass in place, the framework having a substantially U-shaped rod assembly, said extruded member having a first U-shaped cavity formed thereby for passing over the framing rod and engaging it solely in frictional contact on three sides and said extruded member integrally extending further structure facing inwardly from the frame defining a second U-shaped cavity for solely engaging in close frictional contact the windshield glass edge thereby holding the windshield frictionally upon said framework for quick removal manually without tools by movement of the windshield perpendicular to the framework.

2. Windshield mounting means as defined in claim 1 wherein the second U-shaped cavity is formed by a substantially L-shaped member extending from the bottom closure portion of the first U-shaped cavity, with the two U-shaped cavities being substantially perpendicular, whereby a windshield may be removably mounted from opposing edges on an existing framework rod without displacing a framework member.

3. Windshield mounting means as defined in claim 1 in combination with a substantially flat windshield window having at least two substantially parallel edges retained in the second U-shaped cavity of said extruded member, a framework array with longitudinally disposed rods positioned to mate with the extruded member along three edges with the extruded member thereby holding the window on the framework by frictional contact of the first U-shaped cavity over the rods in the framework.

4. Windshield mounting means as defined in claim 3 wherein the rods are substantially cylindrical and the first U-shaped portion of the extruded member defines inturned portions terminating in a cylindrical rim dimensioned to resiliently snap over the cylindrical rods of the framework to hold the members together in solid frictional mating engagement.

5. Windshield mounting means as defined in claim 3, wherein the rods comprise two substantially parallel rod portions vertically mounted on the cowling of a vehicle such as a golf cart.

6. Windshield mounting means as defined in claim 5 wherein the two rods are connected in a substantially U-shaped frame with the closed end supporting a canopy cover.

7. Windshield mounting means as defined in claim 6 wherein the windshield has an upper edge held by a strip of said plastic member to the closed end of said U-shaped frame.

8. Windshield mounting means as defined in claim 7 wherein the windshield has a lower edge held in a direction preventing disengagement of the plastic member from the framework by a removable retainer clip engaging said cowling.

9. Windshield mounting means as defined in claim 8 wherein the canopy cover has a rim serving as a top edge windshield retainer preventing disengagement of the plastic strip from the rods.

10. In combination, an all weather vehicle with a replaceable windshield, such as a golf cart,
 a vehicle cowling,
 a framework mounted on the cowling for mounting the windshield presenting a pair of substantially parallel vertically disposed rods with a top cross connecting link rod section, and
 a selectively removable windshield having a snap-on rim with mounting structure thereon comprising a resilient plastic extruded frictional member engaging the windshield and having a substantially U-shaped extension extending perpendicular thereto and disposed to mate with and frictionally snap on said framework rods.

11. The combination defined in claim 10 having a removable locking clip engaging the cowling and the windshield to hold the windshield and prevent it from movement outwardly in a direction disengaging the snap-on mounting structure from the rods.

12. The combination defined in claim 10 wherein the framework supports a top canopy, and the canopy has a rim overlapping the windshield top edge and interengaged plastic member to prevent disengagement of the snap-on member from the framework.

* * * * *